(12) United States Patent
Chen et al.

(10) Patent No.: US 10,965,210 B2
(45) Date of Patent: Mar. 30, 2021

(54) POWER CONTROLLERS AND CONTROL METHODS FOR PFC CONVERTER

(71) Applicant: Leadtrend Technology Corporation, Zhubei (TW)

(72) Inventors: Yao-Tsung Chen, Zhubei (TW); Kuan-Hsien Chou, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 16/725,621

(22) Filed: Dec. 23, 2019

(65) Prior Publication Data

US 2020/0274441 A1    Aug. 27, 2020

(30) Foreign Application Priority Data

Feb. 21, 2019  (TW) .................................. 108105845

(51) Int. Cl.
*H02M 1/42*     (2007.01)
*H02M 3/156*    (2006.01)

(52) U.S. Cl.
CPC ............ *H02M 1/4266* (2013.01); *H02M 1/42* (2013.01); *H02M 1/4225* (2013.01); *H02M 3/156* (2013.01); *H02M 2003/1566* (2013.01)

(58) Field of Classification Search
CPC .... H02M 1/42; H02M 1/4225; H02M 1/4266; H02M 3/156; H02M 2003/1566
See application file for complete search history.

(56) References Cited

U.S. PATENT DOCUMENTS

| 10,312,799 | B1 * | 6/2019 | Turchi | ................ | H02M 1/4225 |
| 2017/0019030 | A1 * | 1/2017 | Sugawara | ........... | H02M 1/4225 |
| 2018/0278151 | A1 * | 9/2018 | Gritti | .................. | H02M 1/4225 |
| 2020/0395843 | A1 * | 12/2020 | Hiasa | .................. | H02M 1/4225 |

* cited by examiner

*Primary Examiner* — Kyle J Moody
*Assistant Examiner* — Lakaisha Jackson
(74) *Attorney, Agent, or Firm* — McClure, Qualey & Rodack, LLP

(57) ABSTRACT

A power controller for use in a PFC power converter is capable being immune from audible noise during the test of load transient response. A transconductor with a transconductance compares an output voltage of the PFC power converter with a target voltage to provide a compensation current, which builds up a compensation voltage. An ON-time controller is configured to end an ON time of a power switch in response to the compensation voltage. An OFF-time controller is configured to end an OFF time of the power switch. A compensation-voltage designator presets the compensation voltage. A status detector controls the transconductor, the ON-time controller, the OFF-time controller, and the compensation-voltage designator, in response to the output voltage, a top-boundary voltage and a bottom-boundary voltage.

18 Claims, 9 Drawing Sheets

POWER CONTROLLERS AND CONTROL METHODS FOR PFC CONVERTER

CROSS-REFERENCE TO RELATED APPLICATION

This application claims priority to and the benefit of Taiwan Application Series Number 108105845 filed on Feb. 21, 2019, which is incorporated by reference in its entirety.

BACKGROUND

The present disclosure relates generally to switch-mode power supplies, and, more particularly, to control methods and power converts that provide power factor correction.

Power factor correction (PFC) shapes the input current of off-line power supplies to maximize the real power available from the mains. Ideally, the electrical appliance should present a load that emulates a pure resistor, in which case the reactive power drawn by the device is zero. Inherent in this scenario is the absence of input current harmonics—the current is a perfect replica of the input voltage (usually a sine wave) and is exactly in phase with it. In this case the current drawn from the mains is at a minimum for the real power required to perform the needed work, and this minimizes losses and costs associated not only with the distribution of the power, but also with the generation of the power and the capital equipment involved in the process. The freedom from harmonics also minimizes interference with other devices being powered from the same source.

Another reason to employ PFC in many of today's power supplies is to comply with regulatory requirements. Today, electrical equipment in Europe and Japan must comply with the IEC61000-3-2. This requirement applies to most electrical appliances with input power of 75 W (Class D equipment) or greater, and it specifies the maximum amplitude of line-frequency harmonics up to and including the 39th harmonic. Additionally, many energy efficiency requirements also carry a PFC requirement such as the Energy Star 5.0 for Computers and Energy Star 2.0 for External Power Supplies, and for TV effective November 2008.

FIG. 1 demonstrates switch-mode power supply 10 providing the function of PFC. Switch-mode power supply 10 has bridge rectifier 12, PFC power converter 14, and voltage/current regulator 16. Bridge rectifier 12 converts alternating-current (AC) voltage $V_{AC}$ from the mains into direct-current (DC) voltage $V_{IN1}$ having a M-shaped waveform. DC voltage $V_{IN1}$ at power line IN1 acts as an input power source for PFC power converter 14, which emulates a pure resistor to drain current from power line IN1 and to accordingly build up at power line IN2 DC voltage $V_{IN2}$, a relatively more stable voltage than DC voltage $V_{IN1}$. Using DC voltage $V_{IN2}$ as an input power source, voltage/current regulator 16 provides much more stable output voltage $V_{OUT}$ complying with the requirements that load 18 needs.

For example, PFC power converter 14 could be a booster, voltage/current regulator 16 an LLC resonant converter or a flyback power converter.

DC voltage $V_{IN2}$ cannot vary wildly and need be confined within a reasonable range. If DC voltage $V_{IN2}$ goes wild because of violent change of load 18 during, for example, test of load-transient response, DC voltage $V_{IN2}$ might become over high, causing the sudden shutdown of PFC power converter 14 and the unstableness of the whole switch-mode power supply 10. Audible noise might occur as well because of the shutdown and the resume of PFC power converter 14.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
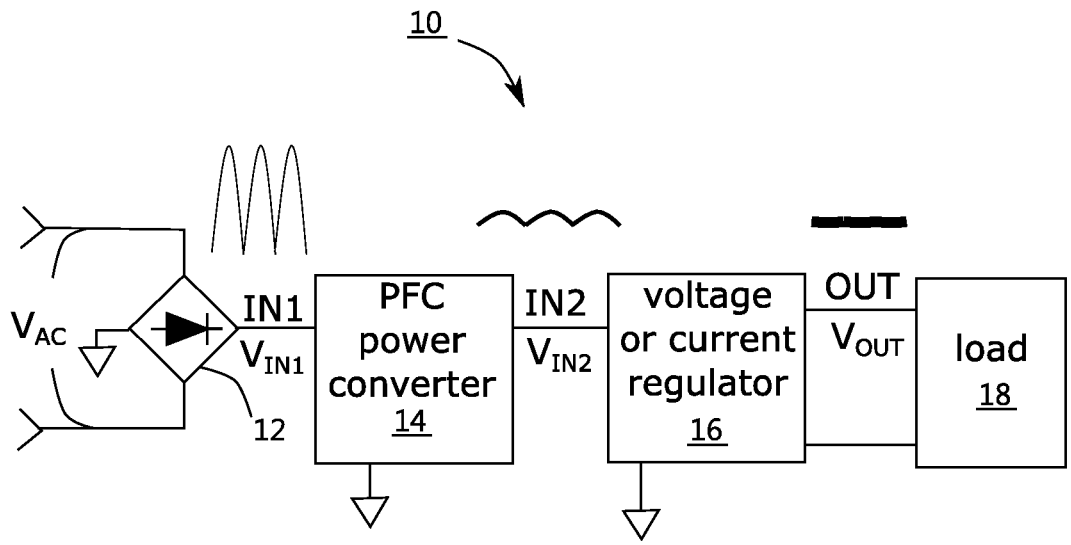
FIG. 1 demonstrates switch-mode power supply 10 providing the function of PFC.
Figure 2:
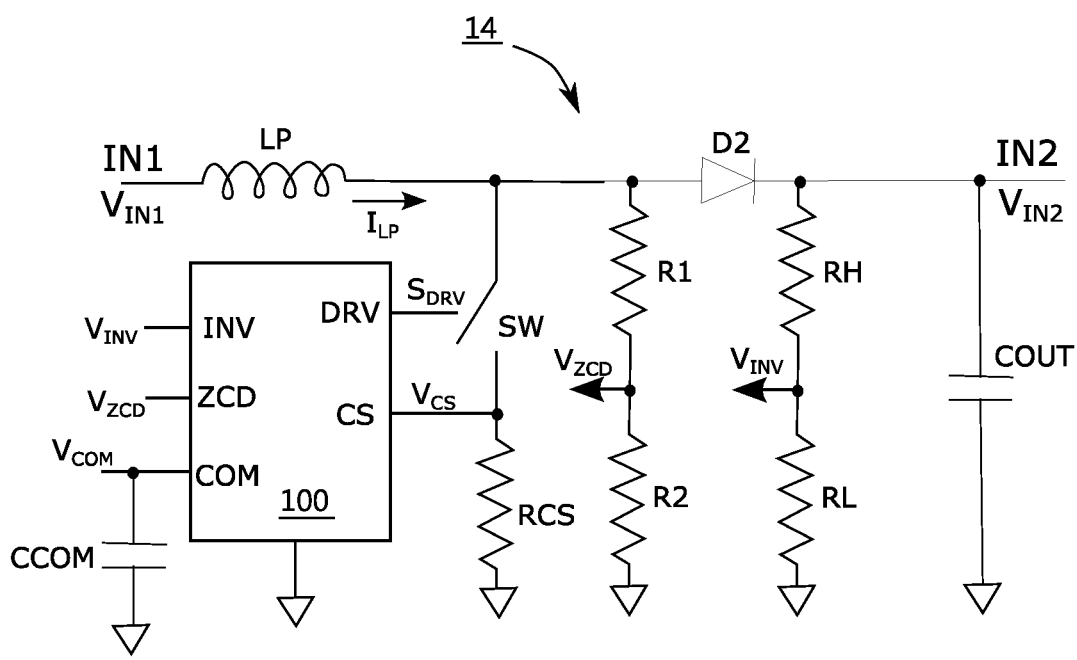
FIG. 2 demonstrates PFC power converter 14 according to embodiments of the invention.

FIG. 2 demonstrates PFC power converter 14 according to embodiments of the invention. PFC power converter 14, as a switch-mode power supply, uses DC voltage $V_{IN1}$ as an input power source to generate DC voltage $V_{IN2}$ as an output power source. DC voltage $V_{IN2}$ is the output voltage of PFC power converter 14. The main purpose of PFC power converter 14 is to correct the power factor of switch-mode power supply 10 and to at the same time provide a relatively-stable DC voltage $V_{IN2}$.

PFC power converter 14 is in the topology of a booster converter, having inductor LP, power switch SW, current-sensing resistor RCS, compensation capacitor CCOM, resistors R1, R2, RH and RL, rectifier diode D2, output capacitor COUT, and power controller 100. Resistors R1 and R2 are for providing zero-current-detection (ZCD) signal $V_{ZCD}$ to power controller 100 to detect the moment when inductor current $I_{LP}$ that flows through inductor LP becomes zero, and this function is often called as ZCD. Resistors RH and RL feeds back to power controller 100 output voltage $V_{INV}$, which is compared with target voltage $V_{REF-TRG}$ to build compensation voltage $V_{COM}$, an error signal, on compensation capacitor CCOM. In this specification, target voltage $V_{REF-TRG}$ is, but not is not limited to, 2.5V. Based on compensation voltage $V_{COM}$ and ZCD signal $V_{ZCD}$, power controller 100 generates pulse-width-modulation (PWM) signal $S_{DRV}$ to control power switch SW, so as to create switching cycles, each consisting of an ON time $T_{ON}$, a period of time when power switch SW conducts, and an OFF time $T_{OFF}$, a period of time when it does not. Power controller 100 is configured to make the average of inductor current $I_{LP}$ in phase with DC voltage $V_{IN1}$, and to stabilize DC voltage $V_{IN2}$ within a reasonable range making output voltage $V_{INV}$ around target voltage $V_{REF-TRG}$. Output voltage $V_{INV}$, as a divided result output by a voltage divider consisting of resistors RH and RL, is in proportion to DC voltage $V_{IN2}$.

According to embodiments of the invention, PFC power converter 14 employs constant ON-time (COT) control, and operates in critical mode, which is also called as boundary mode or transition mode, so as to perform the function of PFC. Under COT control, the duration of ON time $T_{ON}$ of power switch SW is substantially determined by compensation voltage $V_{COM}$, and has substantially nothing to do with DC voltage $V_{IN1}$. Critical-mode operation, as known in the art, makes the ON time $T_{ON}$ of a next switching cycle start at about the moment when inductor current $I_{LP}$ drops to 0. The cooperation of COT control and critical-mode operation could render a good result in regard to PFC.

Figure 3A:
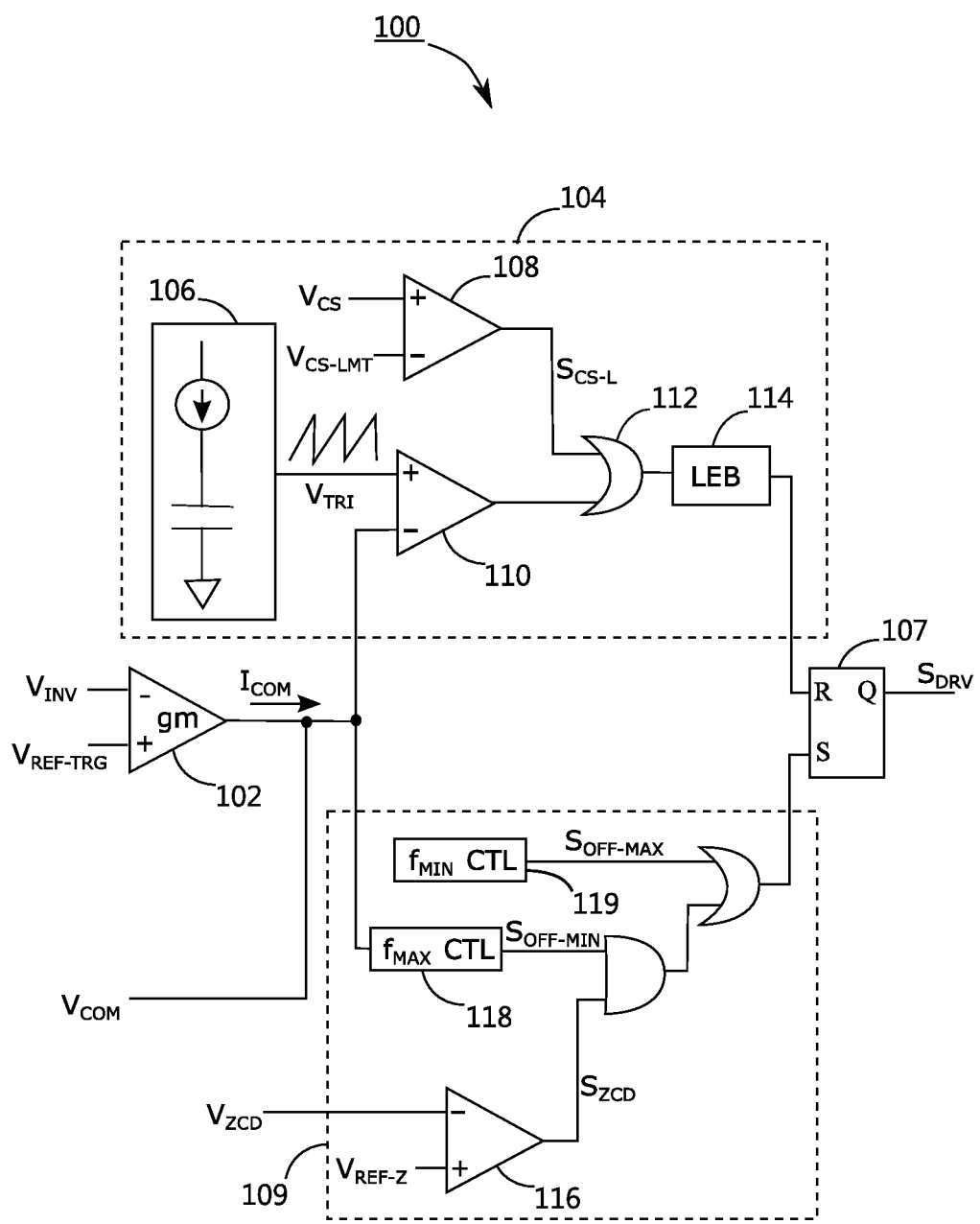
FIG. 3A demonstrates the circuit structure of power controller 100 and related circuits when operating under a normal condition.

FIG. 3A demonstrates the circuit structure of power controller 100 and related circuits when operating under a normal condition. Power controller 100 could be a packaged integrated circuit chip formed on a monocrystalline silicon wafer. Power controller 100 includes, but not is not limited to include, transconductor 102, ON-time controller 104, OFF-time controller 109, and SR flip-flop 107.

Transconductor 102 compares output voltage $V_{INV}$ and target voltage $V_{REF-TRG}$, and accordingly outputs compensation current $I_{COM}$, which is based on the transconductance of transconductor 102, to charge or discharge compensation capacitor CCOM outside power controller 100 and to build up compensation voltage $V_{COM}$.

In ON-time controller 104, COT control is realized by comparator 110 and triangular-wave generator 106 together. Triangular-wave generator 106 generates triangular-wave signal $V_{TRI}$, which ramps up with slope RA during ON time $T_{ON}$. Comparator 110 compares triangular-wave signal $V_{TRI}$ and compensation voltage $V_{COM}$, and resets SR flip-flop 107 if it is detected that triangular-wave signal $V_{TRI}$ exceeds compensation voltage $V_{COM}$, so as to end ON time $T_{ON}$. The duration of ON time $T_{ON}$ is determined basically by slope RA and compensation voltage $V_{COM}$, and is independent to DC voltage $V_{IN1}$. Therefore, ON-time controller 104 could achieve COT control.

To avoid the risk when inductor current $I_{LP}$ becomes over-high, comparator 108 in ON-time controller 104 compares current-sensing voltage $V_{CS}$ (from current-sensing resistor RCS) with current-limiting voltage $V_{CS-LMT}$, to generate signal $S_{CS-L}$. Current-sensing voltage $V_{CS}$ is in proportion to the current flowing through current-sensing resistor RCS, and is capable of being representative the current flowing through power switch SW. Once current-sensing voltage $V_{CS}$ exceeds current-limiting voltage $V_{CS-LMT}$, signal $S_{CS-L}$ is activated and transmitted through OR gate 112, leading-edge blanking (LEB) apparatus 114, and to reset SR flip-flop 107, so as to end ON time $T_{ON}$.

LEB apparatus 114 stops SR flip-flop 107 from being reset before the duration of ON time $T_{ON}$ exceeds minimum ON time $T_{ON-MIN}$. In other words, LEB apparatus 114 determines minimum ON time $T_{ON-MIN}$, the minimum of the duration of ON time $T_{ON}$.

Inside OFF-time controller 109, comparator 116 compares ZCD signal $V_{ZCD}$ and zero-reference voltage $V_{REF-Z}$ to provide signal $S_{ZCD}$ and to achieve critical-mode operation. When ZCD signal $V_{ZCD}$ drops beneath zero-reference voltage $V_{REF-Z}$, signal $S_{ZCD}$ could be activated to set SR flip-flop 107, so as to end OFF time $T_{OFF}$ and to start the ON time $T_{ON}$ of the next switching cycle.

Critical-mode operation could result in very high switching frequency and cause high switching loss of power switch SW when DC voltage $V_{IN1}$ is around a voltage valley, or is about 0V. To avoid this, OFF-time controller 109 is equipped with maximum switching frequency limiter 118, which provides, in response to compensation voltage $V_{COM}$, minimum-OFF-time signal $S_{OFF-MIN}$ to determine minimum OFF time $T_{OFF-MIN}$ and maximum switching frequency $f_{MAX}$ as well. Analogously, minimum switching frequency limiter 119 provides maximum OFF time signal $S_{OFF-MAX}$ to determine maximum OFF time $T_{OFF-MAX}$ and minimum switching frequency $f_{MIN}$. The combination of maximum switching frequency limiter 118 and minimum switching frequency limiter 119 confines OFF time $T_{OFF}$ to be somewhere within the range between minimum OFF time $T_{OFF-MIN}$ and maximum OFF time $T_{OFF-MAX}$.

OFF-time controller 109 could make PFC converter 14 operate under critical mode, and confine the switching frequency $f_{SW}$ of power switch SW to be within the range between minimum switching frequency $f_{MIN}$ and maximum switching frequency $f_{MAX}$.

Figure 3B:
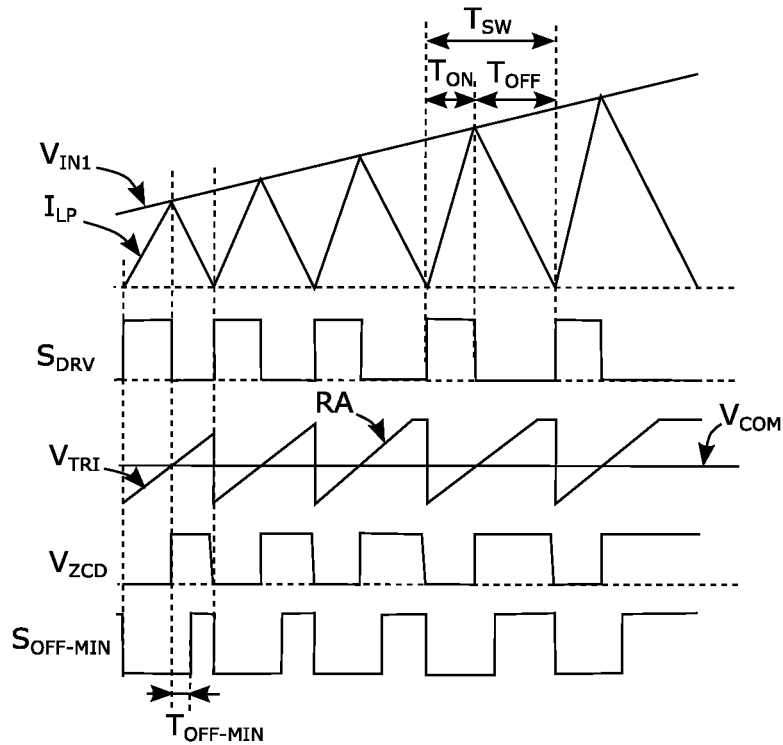
FIG. 3B demonstrates waveforms of some signals in FIG. 3A.

FIG. 3B demonstrates waveforms of some signals in FIG. 3A. PWM signal $S_{DRV}$ demonstrates several switching cycles $T_{SW}$ each consisting of an ON time $T_{ON}$ and an OFF time $T_{OFF}$.

Shown in FIG. 3B, ON time $T_{ON}$ ends and OFF time $T_{OFF}$ starts when triangular-wave signal $V_{TRI}$, which ramps up with slope RA, exceeds compensation voltage $V_{COM}$. Even though DC voltage $V_{IN1}$ varies over time, the duration of ON time $T_{ON}$ is substantially a constant, as the name of COT control implies, determined by compensation voltage $V_{COM}$ and triangular-wave signal $V_{TRI}$.

Under critical-mode operation, inductor current $I_{LP}$ could start from 0 A, and reaches its peak at the end of ON time $T_{ON}$. Since COT control has made ON time $T_{ON}$ about a constant for each switching cycle $T_{SW}$, the peak of inductor current $I_{LP}$ is in proportion to the magnitude of DC voltage $V_{IN1}$ during a switching cycle.

When OFF time $T_{OFF}$ just starts, ZCD signal $V_{ZCD}$ reflects the magnitude of DC voltage $V_{IN2}$, a constant, and inductor current $I_{LP}$ ramps downward linearly, releasing the electric energy stored by inductor LP to build up DC voltage $V_{IN2}$. Eventually inductor current $I_{LP}$ becomes 0 A as the electric energy stored by inductor LP exhausts, so ZCD signal $V_{ZCD}$ starts dropping abruptly. Once ZCD signal $V_{ZCD}$ goes below 0V, OFF-time controller 109 ends OFF time $T_{OFF}$ and starts the ON time $T_{ON}$ of the next switching cycle.

FIG. 3B also demonstrate minimum OFF-time signal $S_{OFF-MIN}$ that is provided by maximum switching frequency limiter 118 and determines minimum OFF time $T_{OFF-MIN}$. Off-time controller 109, having maximum switching frequency limiter 118, makes OFF time $T_{OFF}$ not less than minimum OFF time $T_{OFF-MIN}$, which is determined in response to compensation voltage $V_{COM}$.

Function of over-voltage protection (OVP) could be provided by power controller 100 to avoid any over stress or permanent damage caused by over-high DC voltage $V_{IN2}$. For example, if it is found that output voltage $V_{INV}$, representative of DC voltage $V_{IN2}$, exceeds 4.0V for example, power controller 100 shuts down, keeping power switch SW OFF constantly, to stop power conversion.

Nevertheless, test of load-transient response, a test under the condition that load of a power supply varies quickly and violently, might accidentally trigger OVP, causing power controller 100 to shut down. Even though power controller 100 might automatically resume to convert power again when DC voltage $V_{IN2}$ drops later within a safe range, the abrupt shutdown and recovery of power controller 100 could cause unpleasant and unacceptable audible noise.

To solve the issue of audible noise, one embodiment of the invention introduces top-boundary voltage $V_{REF-O}$ and bottom-boundary voltage $V_{REF-U}$ with that output voltage $V_{INV}$ is compared. According to embodiments of the invention, it is for example predetermined that OVP voltage $V_{REF-OVP}$, top-boundary voltage $V_{REF-O}$, target voltage $V_{REF-TRG}$, and bottom-boundary voltage $V_{REF-U}$ are 4.0V, 2.6V, 2.5V and 2.3V respectively. If output voltage $V_{INV}$ goes more than OVP voltage $V_{REF-OVP}$, OVP is triggered and power controller 100 shuts down to stop power conversion. When output voltage $V_{INV}$ is more than top-boundary voltage $V_{REF-O}$, over-voltage regulation, OVR, is triggered to diminish power conversion. On the other hand, when output voltage $V_{INV}$ goes down below bottom-boundary voltage $V_{REF-U}$, under-voltage regulation, UVR, is triggered to boost power conversion.

Figure 4:
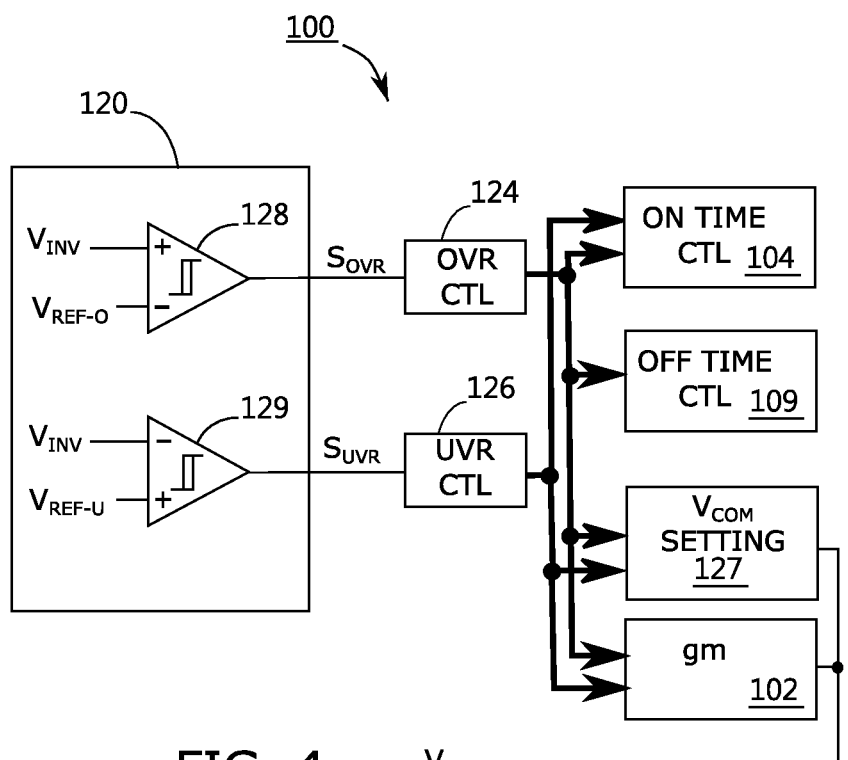
FIG. 4 shows some circuits in power controller 100 that are relevant to OVR and UVR.

FIG. 4 shows some circuits in power controller 100 that are relevant to OVR and UVR. As FIG. 4 demonstrates, power controller 100 has status detector 120, OVR controller 124, and UVR controller 126. OVR controller 124 and UVR controller 126 control transconductor 102, ON-time controller 104, OFF-time controller 109, and compensation voltage designator 127.

Status detector 120 detects whether over-voltage (OV) event and under-voltage (UV) events occur or cancel, to accordingly trigger corresponding strategies. Comparator 128 compares output voltage $V_{INV}$ with top-boundary voltage $V_{REF-O}$, while comparator 129 compares output voltage $V_{INV}$ with bottom-boundary voltage $V_{REF-U}$. Comparator 128 is for example a hysteresis comparator that makes OVR signal $S_{OVR}$ "1" in logic when output voltage $V_{INV}$ rises above 2.6V, and "0" in logic when output voltage $V_{INV}$ drops back below 2.5V. Analogously, comparator 129 could be a hysteresis comparator that makes UVR signal $S_{UVR}$ "1" in logic when output voltage $V_{INV}$ drops below 2.3V, and "0" in logic when output voltage $V_{INV}$ rises back over 2.5V. Top-boundary voltage $V_{REF-O}$ and bottom-boundary voltage $V_{REF-U}$ are two boundary voltages that define a safe range therebetween. OVR signal $S_{OVR}$ and UVR signal $S_{UVR}$ are two out-of-range signals, each of which, when being "1" in logic, indicates that output voltage $V_{INV}$ has gone away from the safe range and is almost out of control.

OVR controller 124 is to control the proceeding of OVR in response to OVR signal $S_{OVR}$ from comparator 128. OVR controller 124 controls ON-time controller 104, OFF-time controller 109, compensation voltage designator 127, and transconductor 102. Compensation voltage designator 127 could set, for a very short period of time, compensation voltage $V_{COM}$ to be a predetermined voltage. UVR controller 126 is to control the proceeding of UVR in response to UVR signal $S_{UVR}$ from comparator 129. UVR controller 126 controls ON-time controller 104, compensation voltage designator 127, and transconductor 102.

Figure 5:
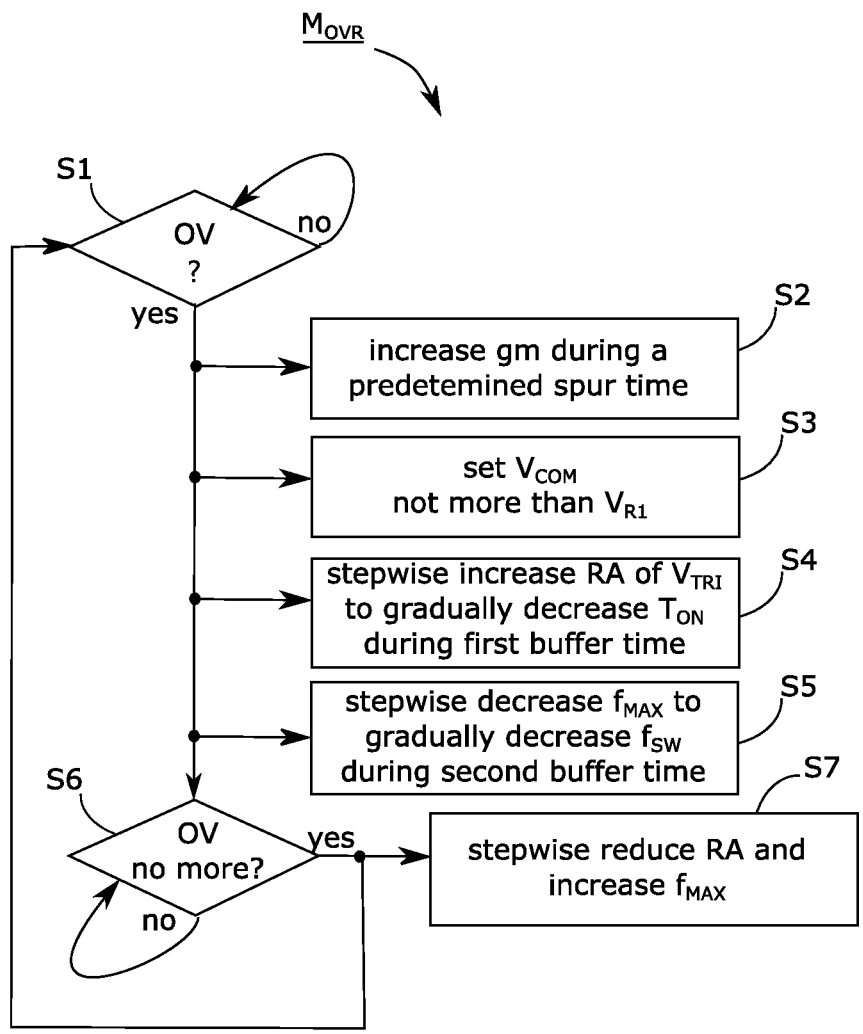
FIG. 5 shows OVR control method $M_{OVR}$ for use in power controller 100 in FIG. 4.

FIG. 5 shows OVR control method $M_{OVR}$ for use in power controller 100 in FIG. 4.

Step S1 uses comparator 128 to compare output voltage $V_{INV}$ with top-boundary voltage $V_{REF-O}$, so as to decide the happening of an OV event that output voltage $V_{INV}$ is over high.

The output of comparator 128 turns to "1" in logic when it is determined that an OV event is happening, to perform OVR by triggering four strategies respectively executed by steps S2, S3, S4 and S5. Step 2 increases transconductance gm of transconductor 102 during a predetermined spur time right after triggered by an OV event. Step S3 sets briefly compensation voltage $V_{COM}$ to be not more than a predetermined voltage $V_{R1}$. In other words, step S3 does not affect compensation voltage $V_{COM}$ if compensation voltage $V_{COM}$ is less than predetermined voltage $V_{R1}$, or makes it have the same value of predetermined voltage $V_{R1}$ otherwise. Step S4 defines a first buffer time right after OVR is triggered, and during the first buffer time step S4 stepwise increases slope RA of triangular-wave signal $V_{TRI}$ to gradually decrease ON time $T_{ON}$. After the end of the first buffer time, step S4 makes ON time $T_{ON}$ to be minimum ON time $T_{ON-MIN}$. Step S5 defines a second buffer time right after OVR is triggered, and during the second buffer time step S5 stepwise decreases maximum switching frequency $f_{MAX}$ to gradually elongate OFF time $T_{OFF}$. After the end of the second buffer time, step S5 makes switching frequency $f_{SW}$ to be minimum switching frequency $f_{SW-MIN}$.

Please note that the first buffer time might be the same with or different from the second buffer time. According to embodiments of the invention, the first and second buffer times are completely the same, both having the same length and following the occurrence of an OV event. According to other embodiments of the invention, the first and second buffer times both follow the occurrence of an OV event, but are different from each other in length.

Step S4 stepwise increases slope RA of triangular-wave signal $V_{TRI}$ to gradually decrease ON time $T_{ON}$, but this invention is not limited to however. Embodiments of the invention might have a feature other than slope RA stepwise changed switching cycle by switching cycle, so as to gradually decrease ON time $T_{ON}$.

Step S6 checks, using comparator 128, if the OV event whose existence was found by step S1 is clear, no more existing. Step S7 follows if the OV event is clear, stepwise increasing maximum switching frequency $f_{MAX}$ and stepwise reducing slope RA of triangular-wave signal $V_{TRI}$ to gradually increase both switching frequency $f_{SW}$ and ON time $T_{ON}$, eventually returning back to operations for the normal condition before the happening of the OV event. Simply put, step S7 carries out reversely what steps S4 and S5 have done.

Figure 6A:
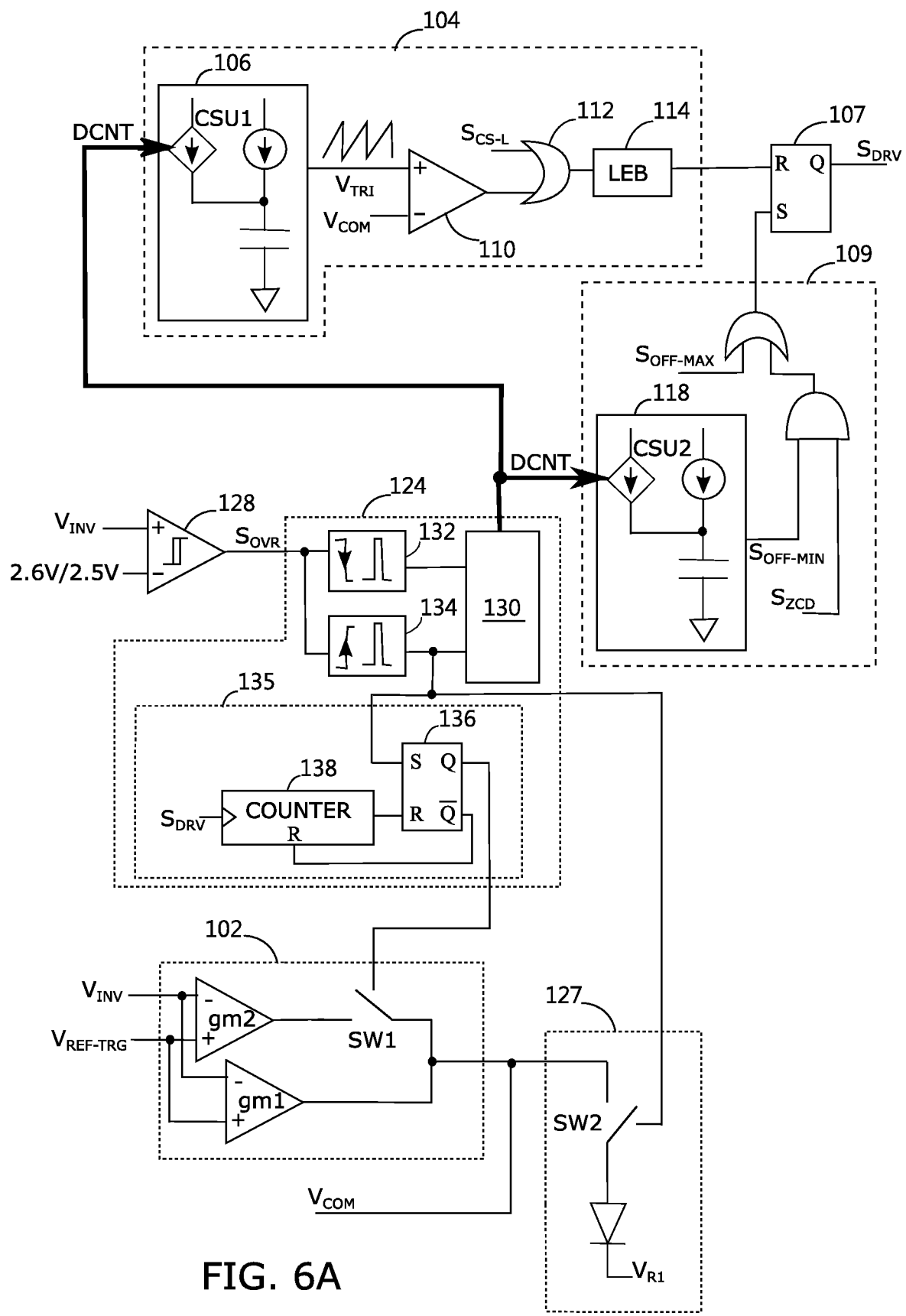
FIG. 6A demonstrates some circuits in FIG. 4 that are related to OVR, to implement OVR control method $M_{OVR}$ shown in FIG. 5.
Figure 6B:
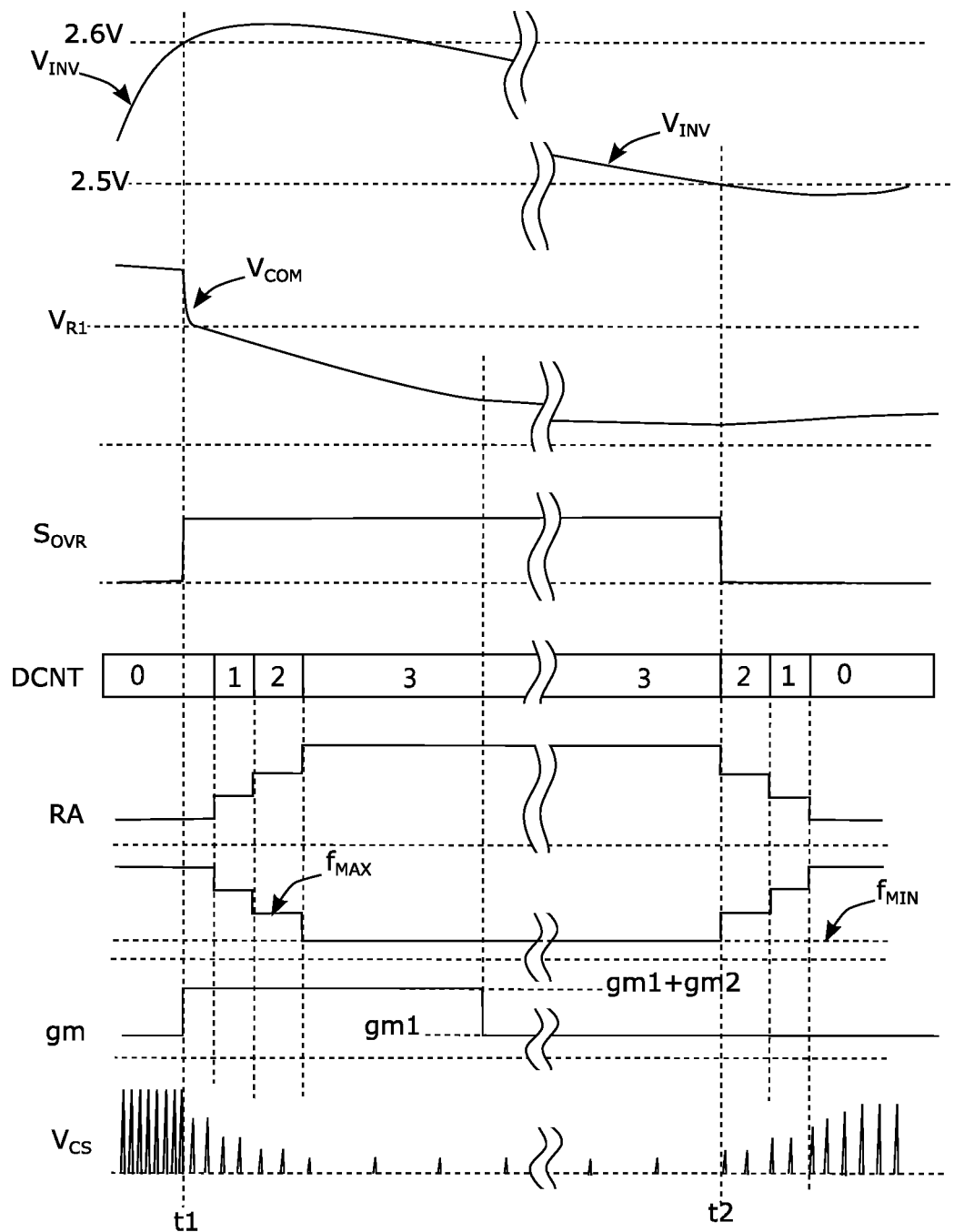
FIG. 6B shows about moments t1 and t2 output voltage $V_{INV}$, compensation voltage $V_{COM}$, OVR signal $S_{OVR}$, count DCNT, slope RA of triangular-wave signal, maximum switching frequency $f_{MAX}$, transconductance gm of transconductor 102 and current-sensing voltage $V_{CS}$.

FIG. 6A demonstrates some circuits in FIG. 4 that are related to OVR, to implement OVR control method $M_{OVR}$ shown in FIG. 5. FIG. 6B shows about moments t1 and t2 (the moments respectively for the occurrence and the termination of an OV event) output voltage $V_{INV}$, compensation voltage $V_{COM}$, OVR signal $S_{OVR}$, count DCNT, slope RA of triangular-wave signal, maximum switching frequency $f_{MAX}$, transconductance gm of transconductor 102 and current-sensing voltage $V_{CS}$.

At moment t1 in FIG. 6B, comparator 128 finds output voltage $V_{INV}$ exceeding 2.6V, and turns OVR signal $S_{OVR}$ from "0" into "1" in logic, indicating the occurrence of an OVR event. The rising edge of OVR signal $S_{OVR}$ makes pulse generator 134 in FIG. 6A generate a short pulse.

The short pulse from pulse generator 134 enables compensation voltage designator 127, which during the short pulse makes compensation voltage $V_{COM}$ not more than the predetermined voltage $V_{R1}$. As exemplified by FIG. 6A, the short pulse from pulse generator 134 turns ON switch SW2, so compensation voltage $V_{COM}$, if it is currently higher than predetermined voltage $V_{R1}$, is pulled down quickly to be about predetermined voltage $V_{R1}$. Pulling down compensation voltage $V_{COM}$ first when finding an OV event can quickly lower the power that power converter 14 converts to supply, deterring the OV event from being adversely stronger.

The short pulse from pulse generator 134 also makes acceleration timer 135 start to time a predetermined spur time. Acceleration timer 135 has for example counter 138 and SR flip-flop 136, configured to make an output of SR flip-flop 136 "1" in logic during the eight consecutive switching cycles after moment t1, the moment when finding the occurrence of an OVR event, and "0" in logic otherwise. In other words, the predetermined spur time equals to the period of time of the eight consecutive switching cycles after moment t1. During the predetermined spur time, switch SW1 in transconductor 102 is ON, making two transconductors working together to drive compensation capacitor CCOM at the same time, so transconductance gm of transconductor 102 is the summation of gm1 and gm2. Beyond the predetermined spur time, transconductance gm of transconductor 102 is only gm1 because switch SW1 is turned OFF and only one transconductor drives compensation capacitor CCOM. It is equivalent to say that transconductance gm of transconductor 102 is boosted up during the predetermined spur time, so compensation voltage $V_{COM}$ could reach, in an accelerated way, the level that properly reflects the present load. As demonstrated by FIG. 6B, compensation voltage $V_{COM}$ still ramps down expeditiously even after compensation voltage $V_{COM}$ has been abruptly pulled down to be about predetermined voltage $V_{R1}$.

The short pulse from pulse generator 134 enables OVR organizer 130 to control the proceeding of OVR and to increase count DCNT by 1 every two switching cycles. After 6 switching cycles count DCNT would reach its maximum number, 3, therefore defining a predetermined buffer time as 6 consecutive switching cycles. This predetermined buffer time could be more or less than 6 consecutive switching cycles in other embodiments of the invention nevertheless, or it could be a duration not counted in light of switching cycles.

Count DCNT affects controllable current source CSU1 in triangular-wave generator 106 that determines slope RA of triangular-wave signal $V_{TRI}$, and at the same time affects controllable current source CSU2 inside maximum switching frequency limiter 118 that is for determining maximum frequency $f_{MAX}$.

As count DCNT increases digitally, the current supplied by current source CSU1 stepwise increases, causing slope RA of triangular-wave signal $V_{TRI}$ to increase stepwise. Therefore, during the predetermined buffer time, ON time $T_{ON}$ decreases switching cycle by switching cycle, so does the peak of current-sensing voltage $V_{CS}$ as shown in FIG. 6B. After the predetermined buffer time, ON time $T_{ON}$ decreases no more, equal to the minimum ON time $T_{ON-MIN}$ decided by LEB apparatus 114.

Analogously, the current supplied by current source CSU2 stepwise decreases as count DCNT increases digitally, so minimum OFF time $T_{OFF-MIN}$ increases stepwise and maximum switching frequency $f_{MAX}$ decreases stepwise, as demonstrated in FIG. 6B. After the predetermined buffer time, maximum switching frequency $f_{MAX}$ is as low as minimum switching frequency $f_{MIN}$, so switching frequency $f_{SW}$ can only become equal to minimum switching frequency $f_{MIN}$.

As switching frequency $f_{SW}$ and ON time $T_{ON}$ are as low as minimum switching frequency $f_{MIN}$ and minimum ON time $T_{ON-MIN}$ respectively, PFC power converter 14 only converts very little amount of power to supply to DC voltage $V_{IN2}$, which, as its representative, output voltage $V_{INV}$, shown in FIG. 6B, starts ramping down, possibly because that the power converted right now is not enough to support the present load.

At moment t2 in FIG. 6B, comparator 128 finds that output voltage $V_{INV}$ drops back below 2.5V, so it turns OVR signal $S_{OVR}$ from "1" into "0" in logic, declaiming the termination of an OV event. In this regard, 2.5V could be deemed as a predetermined steady voltage, output voltage $V_{INV}$ below which is free from an OV event. The falling edge of OVR signal $S_{OVR}$ makes pulse generator 132 (of FIG. 6A) output a short pulse, triggering OVR organizer 130 to control the proceeding of post-OVR and to decrease count DCNT by 1 every two switching cycles. After moment t2 in FIG. 6B, maximum switching frequency $f_{MAX}$ stepwise increases and slope RA stepwise decreases because count DCNT decreases digitally. During a predetermined buffer time after the termination of an OV event, the proceeding of post-OVR makes PFC power converter 14 stepwise recover the operating under a normal condition. According to embodiments of the invention, what the proceeding of post-OVR does is just the reverse of what the proceeding of OVR does, and is comprehensible in view of FIG. 6B and the aforementioned teaching. This invention is not limited to however. For example, according to another embodiment of the invention, the proceeding of post-OVR decreases count DCNT by 1 every three switching cycles, defining another predetermined buffer time longer than that for the proceeding of OVR.

Figure 7:
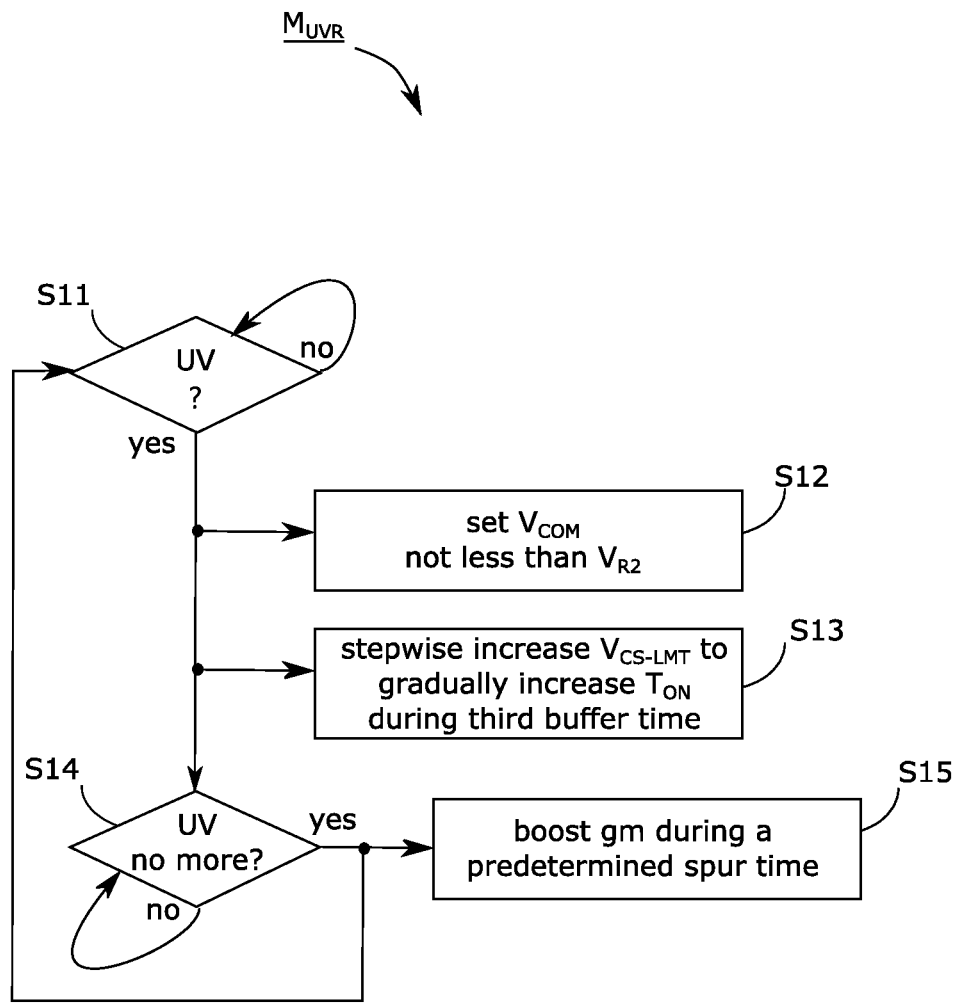
FIG. 7 illustrates UVR control method $M_{UVR}$ suitable to FIG, 4 to realize UVR.

FIG. 7 illustrates UVR control method $M_{UVR}$ suitable to FIG. 4 to realize UVR.

Step S11 uses comparator 129 to compare output voltage $V_{INV}$ with bottom-boundary voltage $V_{REF-U}$, so as to decide the happening of an UV event that output voltage $V_{INV}$ is over low.

The output of comparator 129 turns to "1" in logic when it is determined that an UV event is happening, to perform UVR by triggering strategies respectively executed by steps S12 and S13, and a post-UVR strategy executed by step S15 when the UV event is found to exist no more.

Step S12 sets briefly compensation voltage $V_{COM}$ to be not less than a predetermined voltage $V_{R2}$. In other words, step S12 does not affect compensation voltage $V_{COM}$ if compensation voltage $V_{COM}$ is more than predetermined voltage $V_{R2}$, or forces it to have the same value of predetermined voltage $V_{R2}$ otherwise.

Step S13 initially reduces current-limiting voltage $V_{CS-LMT}$, whose default value is $V_{CS-DEF}$, to be initial value $V_{CS-INT}$, and times a third buffer time, during which current-limiting voltage $V_{CS-LMT}$ starting from initial value $V_{CS-INT}$ stepwise increases to gradually increase ON time $T_{ON}$. Beyond this third buffer time current-limiting voltage $V_{CS-LMT}$ returns back to have its default value $V_{CS-DEF}$. Some embodiments of the invention have the third buffer time equal to the first or second buffer time employed by step S4 or S5 during an OV event, but this invention is not limited to. Some embodiments of the invention might have the third buffer time totally different from the first or second buffer time.

Step S13 stepwise increases current-limiting voltage $V_{CS-LMT}$ to gradually increase ON time $T_{ON}$, but this invention is not limited to however. Another embodiment of the invention might have step S13 stepwise change a feature rather than current-limiting voltage $V_{CS-LMT}$ to gradually increase ON time $T_{ON}$.

Step S14 checks, using comparator 129, if the UV event whose existence was found by step S11 is clear, no more existing. When the UV event exists no more, step S15 boosts transconductance gm of transconductor 102 during a predetermined spur time.

Figure 8A:
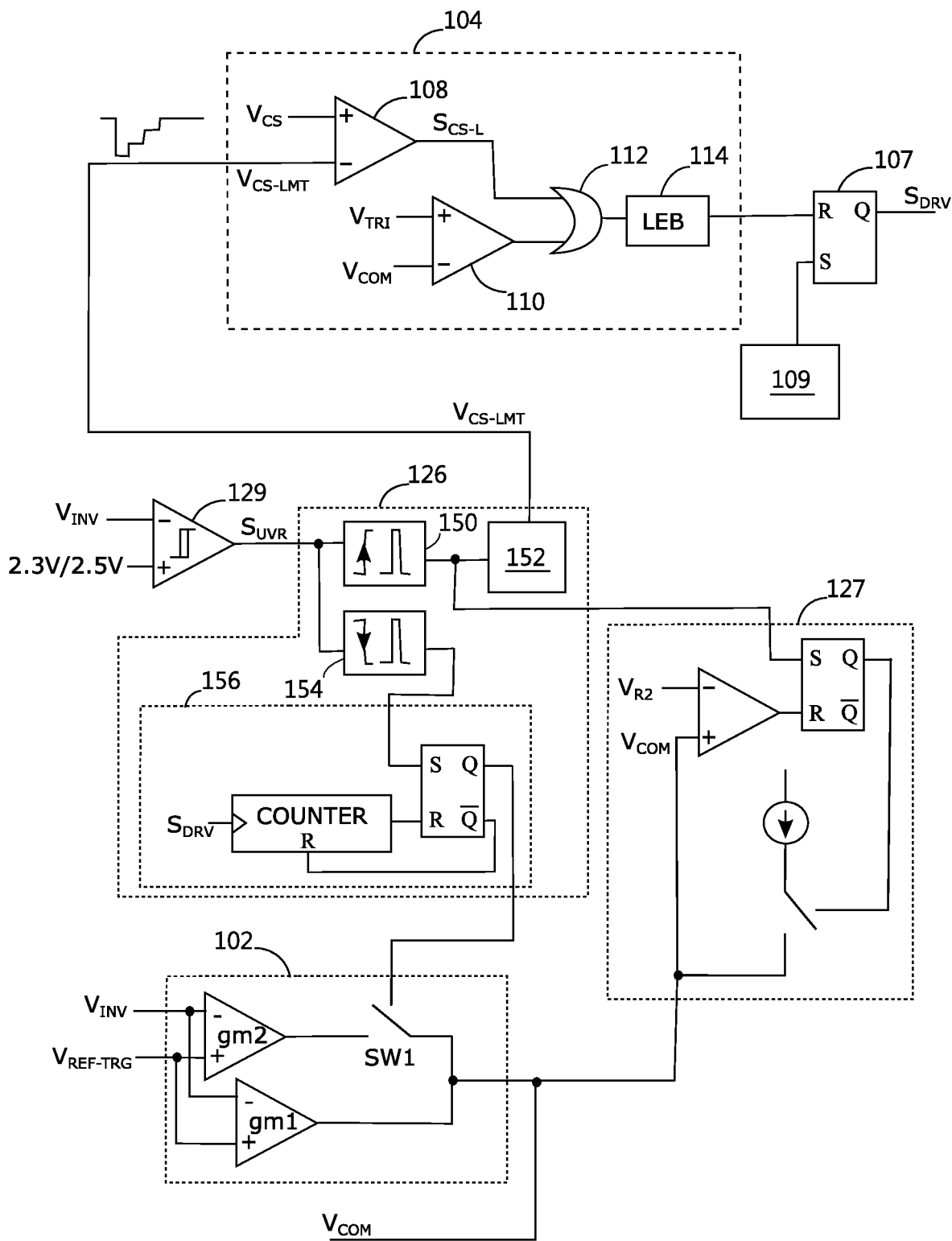
FIG. 8A demonstrates some circuits in FIG. 4 that are related to UVR, to implement UVR control method $M_{UVR}$ shown in FIG. 7.
Figure 8B:
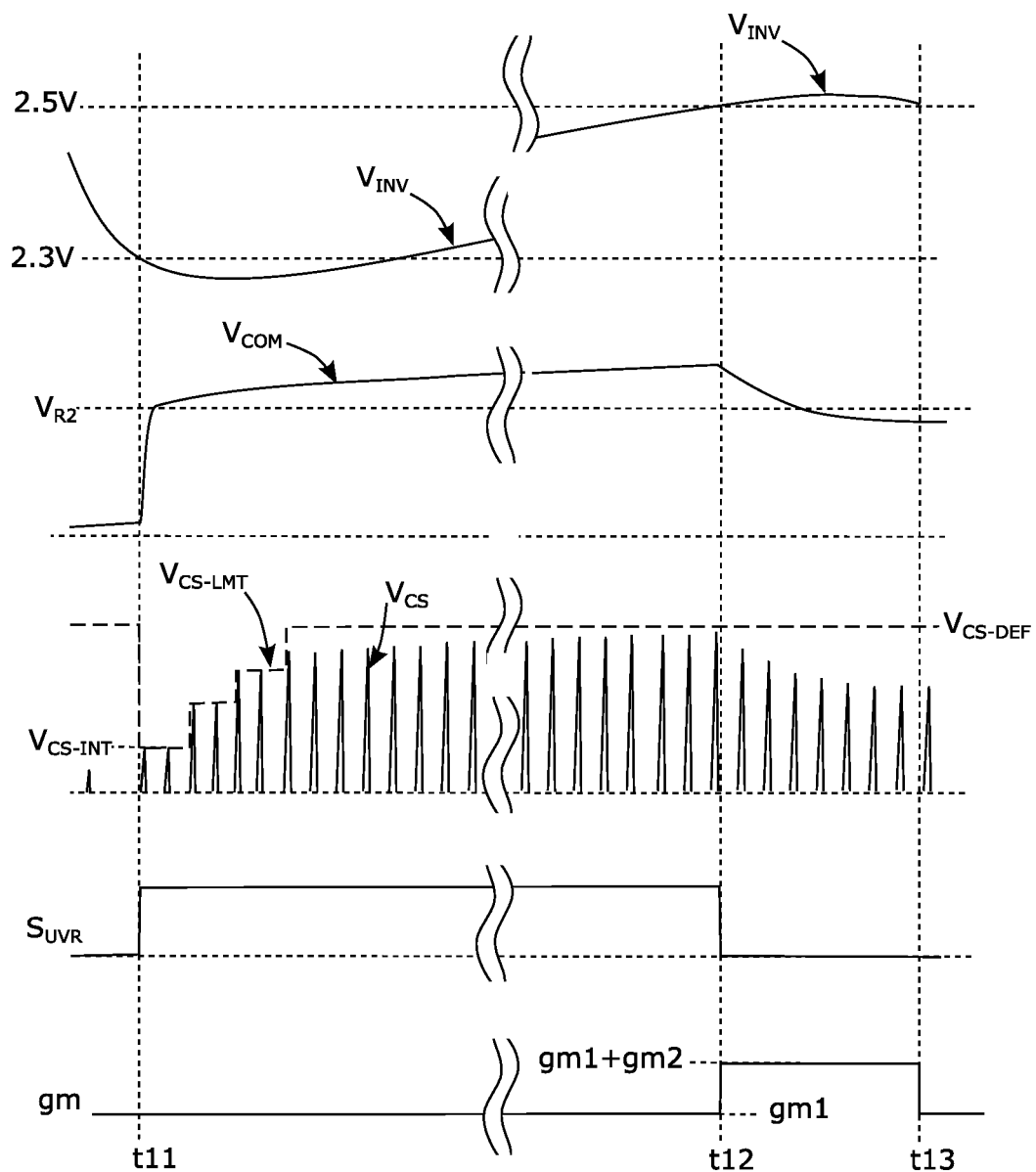
FIG. 8B shows about moments t11 and t12 output voltage $V_{INV}$, compensation voltage $V_{COM}$, current-limiting voltage $V_{CS-LMT}$, current-sensing voltage $V_{CS}$, UVR signal $S_{UVR}$, and transconductance gm of transconductor 102.

FIG. 8A demonstrates some circuits in FIG. 4 that are related to UVR, to implement UVR control method $M_{UVR}$ shown in FIG. 7. FIG. 8B shows about moments t11 and t12 (the moments respectively for the occurrence and the termination of an UV event) output voltage $V_{INV}$, compensation voltage $V_{COM}$, current-limiting voltage $V_{CS-LMT}$, current-sensing voltage $V_{CS}$, UVR signal $S_{UVR}$, and transconductance gm of transconductor 102.

At moment t11 in FIG. 8B, comparator 129 finds output voltage $V_{INV}$ becomes lower than 2.3V, and turns UVR signal $S_{UVR}$ from "0" into "1" in logic, indicating the occurrence of an UVR event. The rising edge of UVR signal $S_{UVR}$ makes pulse generator 150 generate a short pulse.

The short pulse from pulse generator 150 enables compensation voltage designator 127, which during the short pulse makes compensation voltage $V_{COM}$ not less than predetermined voltage $V_{R2}$. As exemplified by FIG. 8A, compensation voltage designator 127 is configured to pull up compensation voltage $V_{COM}$ until it reaches predetermined voltage $V_{R2}$. Pulling up compensation voltage $V_{COM}$ first when finding an UV event can quickly increase the power that power converter 14 converts to supply, deterring the UV event from being adversely stronger.

The short pulse from pulse generator 150 enables current-limiting apparatus 152 in UVR controller 126 to perform a transitional proceeding, which initially reduces current-limiting voltage $V_{CS-LMT}$ to be initial value $V_{CS-INT}$, and times a third buffer time, during which current-limiting voltage $V_{CS-LMT}$ stepwise increases from its initial value $V_{CS-INT}$ to gradually increase ON time $T_{ON}$. Beyond the third buffer time current-limiting voltage $V_{CS-LMT}$ returns back to have its default value $V_{CS-DEF}$. Current-limiting apparatus 152 in FIG. 8B might have for example a counter and a digital-to-analog converter (DAC), where the short pulse from pulse generator 150 has the count of the counter reset to 0, the counter then increases the count using PWM signal $S_{DRV}$ as a clock until the count reaches its maximum, and DAC converts the count into corresponding current-limiting voltage $V_{CS-LMT}$. This transitional proceeding could reduce or avoid the audible noise that might occur when the power converted by PFC power converter 14 changes too violently.

At moment t12 in FIG. 8B, comparator 129 finds that output voltage $V_{INV}$ rises back above 2.5V, so it turns UVR signal $S_{UVR}$ from "1" into "0" in logic, declaiming the termination of an UV event. In this regard, 2.5V could be deemed as a predetermined steady voltage, output voltage $V_{INV}$ above which is free from an UV event. The falling edge of UVR signal $S_{OVR}$ makes pulse generator 154 of FIG. 8A output a short pulse, triggering acceleration timer 156 to time a predetermined spur time from t12 to t13. Acceleration timer 156 could have a circuit structure similar with or the same with acceleration timer 135 of FIG. 6A, and is not detailed herein for brevity. During this predetermined spur time, transconductance gm of transconductor 102 is increased by gm2 for example, so compensation voltage $V_{COM}$ could reach, in an accelerated way, the level that properly reflects the present load. Beyond this predetermined spur time, transconductance gm of transconductor 102 returns back to its default value of gm1 for example.

PFC power converter 14, by utilizing OVR control method $M_{OVR}$ and UVR control method $M_{UVR}$, could prevent DC voltage $V_{IN2}$ from being over high or over low during the test of load transient response, so PFC power converter 14 could operate normally without abrupt shutdown or recovery, to be immune from audible noise.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for use in a power controller of a power converter, the control method comprising:
    comparing an output voltage of the power converter with a target voltage, to provide a compensation current in view of a transconductance and to build up a compensation voltage;
    controlling, in response to the compensation voltage, a power switch to generate switching cycles, each switching cycle consisting of an ON time and an OFF time;
    comparing the output voltage with a boundary voltage;
    providing an out-of-range signal when the output voltage moves across the boundary voltage; and
    performing, in response to the out-of-range signal, at least one of the following steps consisting of:
        setting the compensation voltage to be a predetermined voltage;
        stepwise changing a feature of the power controller during a predetermined buffer time so as to gradually change the ON time; and
        increasing the transconductance during a predetermined spur time.

2. The control method as claimed in claim 1, comprising:
    controlling the ON time in response to the compensation voltage and a triangular-wave signal, wherein the triangular-wave signal has a slope; and
    stepwise changing the slope during the predetermined buffer time, to gradually change the ON time.

3. The control method as claimed in claim 2, wherein the predetermined buffer time starts right after when the output voltage exceeds the boundary voltage.

4. The control method as claimed in claim 3, wherein the predetermined buffer time is a first buffer time, and the control method comprises:
    stepwise increasing the slope to gradually decrease the ON time during the first buffer time right after the output voltage exceeds the boundary voltage; and
    stepwise decreasing the slope to gradually increase the ON time during a second buffer time right after when the output voltage falls below a predetermined steady voltage.

5. The control method as claimed in claim 1, comprising:
    comparing a current-sensing voltage with a current-limiting voltage to control the ON time; and
    stepwise increasing the current-limiting voltage during the predetermined buffer time;

wherein the current-sensing voltage is capable of representing a current flowing through the power switch.

6. The control method as claimed in claim 1, comprising:
making the OFF time not less than a minimum OFF time;
providing the minimum OFF time in response to the compensation voltage; and
stepwise changing the minimum OFF time during the predetermined buffer time.

7. The control method as claimed in claim 1, wherein the power controller is coupled to an inductive device to provide a zero-current detection signal, the control method comprising:
concluding the OFF time in response to the zero-current detection signal.

8. A power controller for use in a PFC power converter, comprising:
a transconductor with a transconductance, for comparing an output voltage of the PFC power converter with a target voltage to provide a compensation current, which builds up a compensation voltage;
an ON-time controller for ending an ON time of a power switch in response to the compensation voltage;
an OFF-time controller for ending an OFF time of the power switch;
a compensation-voltage designator for presetting the compensation voltage; and
a status detector for controlling the transconductor, the ON-time controller, the OFF-time controller, and the compensation-voltage designator, in response to the output voltage, a top-boundary voltage and a bottom-boundary voltage.

9. The power controller as claimed in claim 8, wherein the ON-time controller comprises a triangular-wave generator for providing a triangular wave signal that the ON-time controller compares with the compensation voltage to conclude the ON time, the triangular wave signal has a slope, and ON-time controller stepwise increases the slope after the output voltage exceeds the top-boundary voltage, so as to gradually decrease the ON time.

10. The power controller as claimed in claim 9, wherein the status detector determines an over-voltage event lifted in response to the output voltage and the top-boundary voltage, and the ON-time controller, in response, stepwise decreases the slope.

11. The power controller as claimed in claim 8, wherein the OFF-time controller makes the OFF time not less than a minimum OFF time, and when the output voltage exceeds the top-boundary voltage the OFF-time controller stepwise increases the minimum OFF time to gradually decrease a switching frequency of the power switch.

12. The power controller as claimed in claim 11, wherein the status detector determines an over-voltage event lifted in response to the output voltage and the top-boundary voltage, and the OFF-time controller, in response, stepwise decreases the minimum OFF time.

13. The power controller as claimed in claim 8, wherein in response to an over-voltage event that the output voltage exceeds the top-boundary voltage the compensation-voltage designator makes the compensation voltage not higher than a predetermined voltage.

14. The power controller as claimed in claim 8, wherein in response to an over-voltage event that the output voltage exceeds the top-boundary voltage the transconductance of the transconductor is increased for a predetermined spur time.

15. The power controller as claimed in claim 8, wherein in response to an under-voltage event that the output voltage is below the bottom-boundary voltage the compensation-voltage designator makes the compensation voltage not less than a predetermined voltage.

16. The power controller as claimed in claim 8, wherein the ON-time controller concludes the ON time in response to a current-limiting voltage and a current-sensing voltage representing a current flowing through a power switch of the power converter, and in response to an under-voltage event that the output voltage is below the bottom-boundary voltage the ON-time controller stepwise increases the current-limiting voltage to gradually increase the ON time.

17. The power controller as claimed in claim 8, wherein the status detector determines an under-voltage event lifted in response to the output voltage and the bottom-boundarying voltage, and the transconductance accordingly increases for a predetermined spur time.

18. The power controller as claimed in claim 8, wherein the ON-time controller accomplishes constant ON-time control, and the OFF-time controller is capable of operating the power converter in a boundary mode.

* * * * *